(12) United States Patent
Cappellotto

(10) Patent No.: US 9,205,700 B2
(45) Date of Patent: Dec. 8, 2015

(54) OPTIMIZED SPOKE NIPPLE

(75) Inventor: Guido Cappellotto, Arcore (IT)

(73) Assignee: ALPINA RAGGI S.P.A., Lomagna (IT)

( * ) Notice: Subject to any disclaimer, the term of this patent is extended or adjusted under 35 U.S.C. 154(b) by 446 days.

(21) Appl. No.: 13/522,581

(22) PCT Filed: Jan. 14, 2011

(86) PCT No.: PCT/IB2011/050170
§ 371 (c)(1), (2), (4) Date: Jul. 17, 2012

(87) PCT Pub. No.: WO2011/086523
PCT Pub. Date: Jul. 21, 2011

(65) Prior Publication Data
US 2012/0299365 A1    Nov. 29, 2012

(30) Foreign Application Priority Data

Jan. 18, 2010  (IT) .................... PD10A0004

(51) Int. Cl.
*B60B 21/06* (2006.01)
*B60B 1/04* (2006.01)

(52) U.S. Cl.
CPC ............. *B60B 1/045* (2013.01); *B60B 1/041* (2013.01)

(58) Field of Classification Search
CPC ........ B60B 1/041; B60B 1/043; B60B 1/044; B60B 1/045; B60B 1/046; B60B 1/047; F16B 39/34
USPC ............... 301/58, 61, 55, 104; 29/894.33; 411/302, 304
See application file for complete search history.

(56) References Cited

U.S. PATENT DOCUMENTS

| | | | |
|---|---|---|---|
| 2,778,690 A | | 1/1957 | Horling, Jr. |
| 3,039,508 A | * | 6/1962 | Greene .................. 411/110 |
| 3,221,790 A | * | 12/1965 | Poupitch .............. 411/301 |
| 3,254,691 A | * | 6/1966 | Johnson ............... 411/300 |
| 6,205,664 B1 | * | 3/2001 | Cappellotto ........ 29/894.33 |
| 8,061,945 B2 | * | 11/2011 | Smith .................... 411/267 |

FOREIGN PATENT DOCUMENTS

| | | |
|---|---|---|
| EP | 0838352 A2 | 4/1998 |
| EP | 1559582 A1 | 8/2005 |
| WO | 2004065138 A1 | 8/2004 |

OTHER PUBLICATIONS

International Search Report and Written Opinion in PCT/IB2011/050170.

* cited by examiner

*Primary Examiner* — S. Joseph Morano
*Assistant Examiner* — Jean Charleston
(74) *Attorney, Agent, or Firm* — Kristina Castellano; Castellano PLLC

(57) ABSTRACT

A nipple for spokes of spoked wheels includes a head and a shank, both of which are traversed by one axial through hole which is at least partly threaded, with at least one recess which intersects the threaded surface of the hole and a deformable insert inserted in each recess. The recess and insert are shaped and positioned relative to the hole so that the insert is held in the corresponding recess in a position which partly projects over at least one length in the hole to interfere with the thread of the spoke.

12 Claims, 2 Drawing Sheets

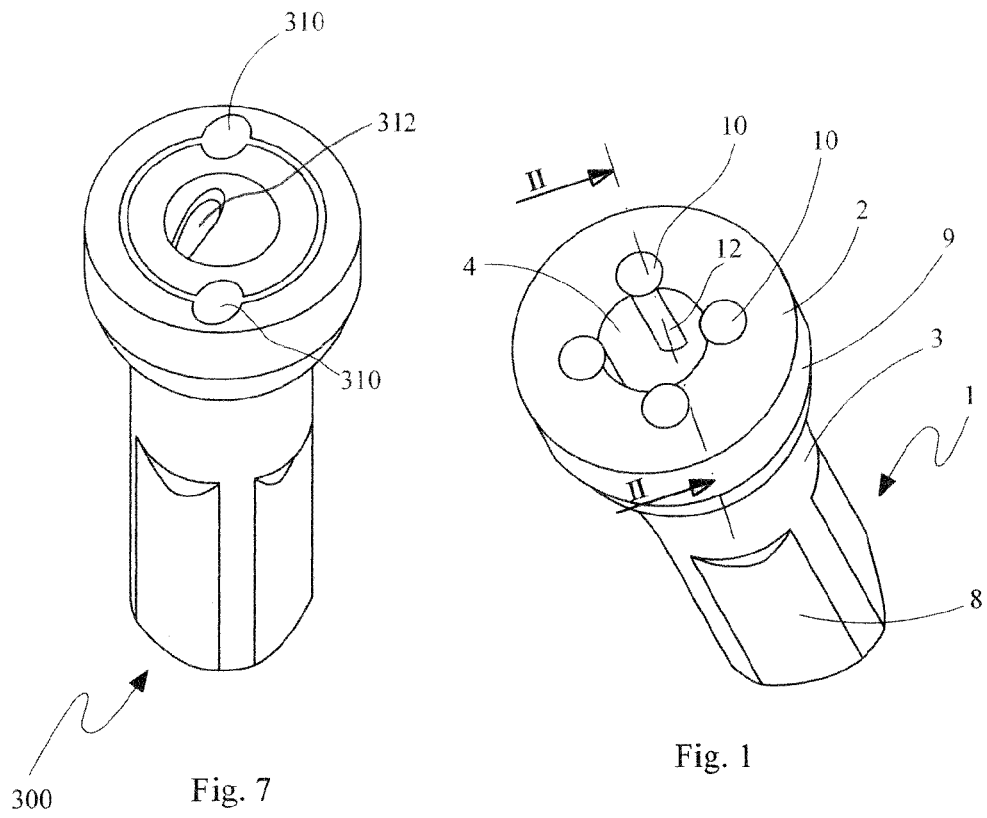
Fig. 7
Fig. 1
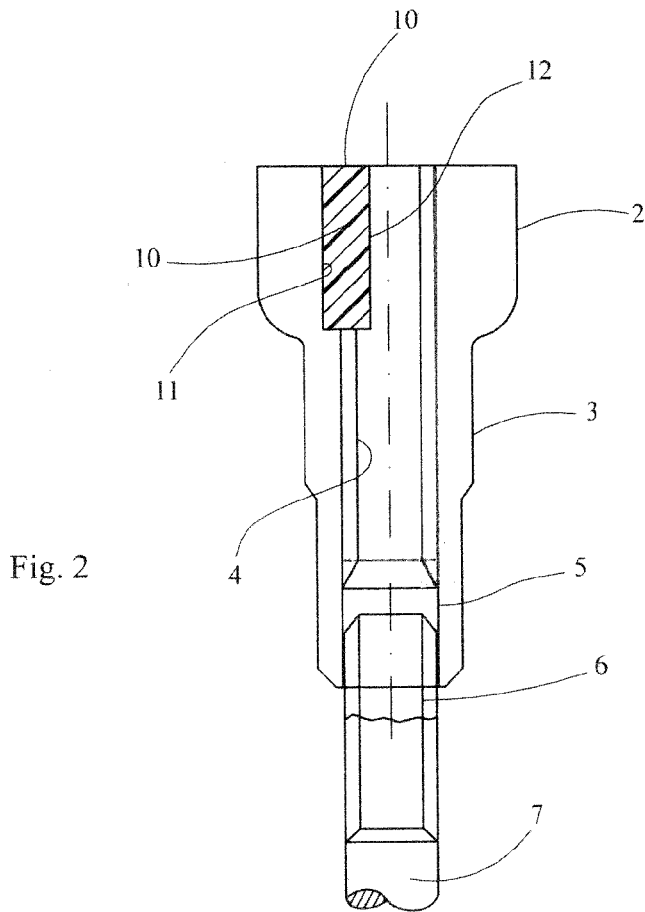
Fig. 2

OPTIMIZED SPOKE NIPPLE

CLAIM FOR PRIORITY

This application is a U.S. National Stage Application of PCT/IB2011/050170 filed on Jan. 14, 2011, claiming priority to Italian patent application PD2010A000004 filed Jan. 18, 2010, the contents of both of which are incorporated herein by reference.

This invention relates to an improved nipple for the construction of spoked wheels.

This nipple is of the type provided with self-locking means to receive a thread of a spoke and prevent undesirable slackening of the nipple, as for example described in Patent EP0838352 by the same applicant or also in U.S. Pat. No. 2,778,690, EP 1 559 582 or WO 2004/065138.

Within the specific art there has been felt a need to provide nipples capable of exerting a self-locking action on a spoke. These nipples, in particular that described in EP0838352, have the undoubted advantage over conventional models that they prevent undesired slackening of the tension of the spoke as a result of the inevitable vibration brought about by use of the wheel. In addition to this, they maintain an appreciable self-locking effect even after repeated adjustments, something which is instead impossible with conventional nipples where immobilisation is brought about through liquid resins and/or adhesives.

Although the nipple described in EP0838352 provides all the above mentioned advantages, it is nevertheless subject to a number of disadvantages. On the one hand this technique of construction gives rise to problems with aligning the hole in the undeformable metal material with that provided in the deformable material. It is also a relatively complex and consequently costly manufacturing process because it requires the nipple to be picked up and positioned several times during manufacture. Furthermore the seat of the self-locking means in the nipple necessarily has a relatively large diameter, with consequent possible weakening of the nipple in the vicinity of its head. Also, being made of plastics material, these self-locking means have little mechanical strength and do not provide any effective contribution to securing the spoke in the threaded portion which they engage.

The problem considered in this invention is that of providing a new improved nipple in comparison with the state of the art in terms of both robustness and reliability of operation and in terms of ease and economy of manufacture.

This problem has been resolved by the invention through an improved nipple which incorporates the features listed in the appended claims.

The characteristics and advantages of the invention will be more apparent from the following detailed description of a number of preferred embodiments of the same illustrated by way of indication and without limitation with reference to the appended drawings, in which:

FIG. 1 is a perspective view of a nipple according to the invention;

FIG. 2 is a view in longitudinal cross-section of the nipple in FIG. 1 and a portion of the spoke fitted thereto;

FIGS. 6 and 7 are perspective views of a third embodiment of the nipple according to this invention, FIG. 6 being an exploded view.

Figure 5:
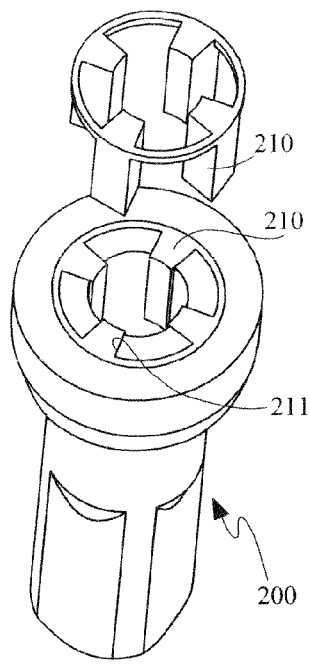
FIG. 5 is an exploded perspective view of a second variant of the nipple in FIG. 3.

In FIGS. 1 and 2, 1 indicates a nipple constructed according to this invention as a whole. In a manner which is in itself known nipple 1 comprises a head 2 which is wider than a shank 3. Head 2 and shank 3 are both traversed by a through hole 4, preferably threaded over its entire length within the head and over at least a portion of the shank.

The remainder of the shank, at the mouth of hole 4 (or the part opposite head 2), these have an enlarged diameter 5 which acts specifically as an opening for nipple 1. A threaded section 6 of a spoke 7 which together with nipple 1 is used in the construction of spoked wheels, which are in themselves conventional, is threaded into hole 4.

On shank 3 of nipple 1, outside the same, there is a first key 8 which is polygonal in plan. A second key 9 which is polygonal in plan or notched (or otherwise shaped) is preferably provided on head 2. Both the keys serve to screw and adjust nipple 1 on the threaded portion of spoke 7.

According to the invention nipple 1 is provided with self-locking means to prevent undesirable slackening of the nipple with respect to the spoke. These means are housed in a seat provided in the head of the nipple, opposite the shank, to prevent undesired slackening of the nipple with respect to spoke 7 when the thread of the latter is screwed into hole 4.

The self-locking means take the form of at least one insert and preferably a plurality of inserts 10 of a material which is relatively soft in comparison with the metal material of the nipple, for example a deformable thermoplastics resin such as polyimide or polyolefin resin (in practice any material which can act as a brake for a thread, such as tin, wood, copper and others).

Each insert 10 is preferably shaped as a cylinder (but it is provided that it may have a prismatic or similar shape—see for example FIG. 5) and is inserted into a corresponding recess 11, such as a blind hole, provided in head 2 and parallel to the axis of nipple 1 in a position such as to intersect the threaded surface of hole 4. It will therefore be noted that in the situation illustrated in the figure the perimeter of the threaded surface of hole 4 is passed through and is in particular interrupted by the presence of recess 11. As a consequence each recess 11 intersects the perimeter of the hole over a restricted length 12 in which each insert projects towards the interior of hole 4 in order to achieve the self-locking effect. In addition to these lengths 12 from which inserts 10 project, further lengths of hole 4 are defined which on the contrary do not interfere with the thread on spoke 7. Specifically, along these further lengths thread 6 of spoke 7 may freely engage the thread provided in hole 4.

In general the recess and insert are shaped and arranged relative to the hole such that the insert is held in the corresponding recess in a position which is partly projecting over the limited circumferential section 12 within hole 4 in order to interfere with the thread of spoke 7.

It is provided that the recesses are obtained by drilling, but they may also be obtained by milling, bevelling, pressing or other similar techniques. What is important is that they are provided in a head part 2 of the nipple where it is correspondingly wider, because otherwise (if the recesses were to be made in the shank of the nipple) the nipple would be excessively weakened. Also, in comparison with the technology in EP0838352 the head is more robust because the radial extension of inserts 10 is limited. More generally, the recess and the corresponding insert which extend substantially longitudinally have a transverse cross-section that is smaller than the transverse cross-section of the said hole.

The nipple as a whole is also strengthened because threads are provided which are capable of retaining the spoke over the entire longitudinal extent of hole 4, even though these threads are interrupted by recesses 11 in head 2.

Figure 4:
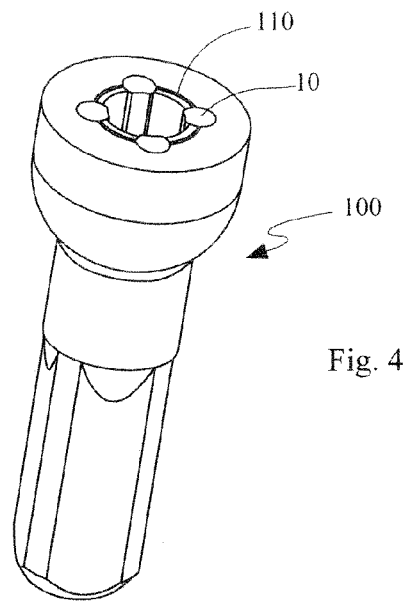
FIGS. 3 and 4 are perspective views of a second embodiment of the nipple according to this invention, FIG. 3 being an exploded view.
Figure 3:
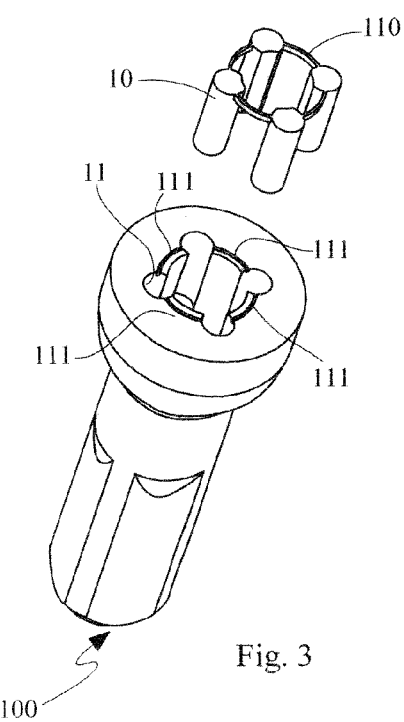

FIGS. 3 and 4 illustrate a variant embodiment of the invention, indicated as a whole by 100. FIG. 3 is an exploded view. Details which are similar to those in the previous example are identified by the same reference numbers. Nipple 100 has inserts 10 joined by bridges 110 to form a "holder" of inserts which in this case can be moved as a whole as an individually manipulatable unit. A series of housings 111 is provided in head 2 for bridges 110, but this is a wholly supplementary measure, it being similarly provided that the surface of head 2 on which bridges 110 bear is flat.

FIG. 5 illustrates an exploded view of a second variant of the nipple according to this invention, indicated as a whole by 200. In this variant inserts 210 are made of prismatic or rectangular shape and are housed in recesses 211 of corresponding shape. These may or may not be joined by bridges 110.

Figure 6:
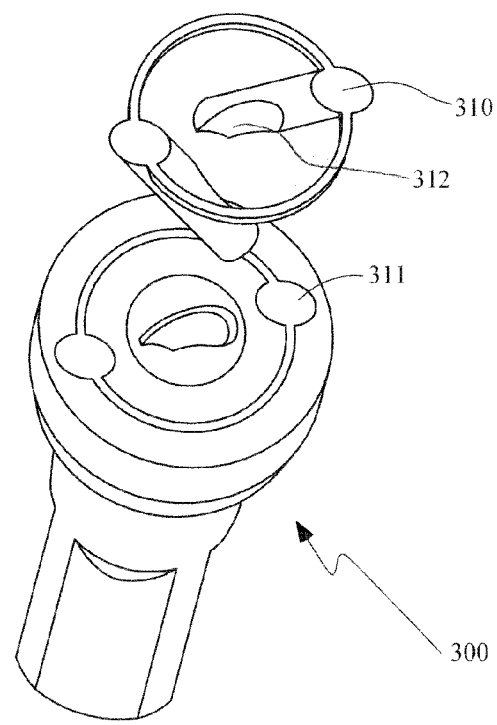

FIGS. 6 and 7 illustrate a further variant embodiment of the nipple according to the invention, indicated as a whole by 300. FIG. 6 depicting an exploded view Nipple 300 differs from the examples in FIGS. 1 to 4 only in the fact that recesses 311 are provided in the threaded part of the shell of hole 4 in a manner which is inclined with respect to the axis of hole 4 itself and therefore inclined with respect to that of recesses 11. The inclination may be in either direction with respect to the helix of the thread and is used to oppose the thrust exerted by the spoke while the nipple is being screwed up. In fact it will be noted that the interference between the spoke and the insert during the screwing stage produces a thrust on the insert which is predominantly in the axial direction of hole 4. The inclination of insert 310 with respect to the axis of hole 4 subdivides the thrust on the insert into two forces, one directed along the axis of corresponding recess 311 and the other directed at right angles against the wall of recess 311. This second thrust component brings about an increase in the friction reaction between the insert and the corresponding recess which is reflected in the insert being better held in the corresponding recess.

The retention of insert 310 in recess 311 is possibly assisted, as in previous cases, by adhesives, bevelling, interference fits and the like. Again provision is made in this example for inserts 310 in a given nipple to be interconnected by a crown of bridges 110 which in addition to joining the set of inserts 310 for the individual nipples together also serves to improve their retention in the corresponding recesses because the fact that an insert 310 is securely held extends its effects to the other inserts attached to it.

It will be noted that inserts 310 may be manufactured in such a way that projecting portion 312 has a surface with a curvature which matches that of hole 4.

Finally, it will be noted that the nipple according to this invention may advantageously be constructed in a single position allowing access to head 2. When held on the machining tool the parts which require drilling, threading and the insertion of inserts 10 are all accessible without the need to pick up the nipple in order to perform further operations.

The invention thus provides many advantages in comparison with nipples of the known type. In the main they may be manufactured using a simplified production process in which the nipple roughed out to its final external shape is provided, hole 4 is drilled and threaded and the recesses are produced, preferably by drilling, the inserts are fitted into the recesses possibly by pressing them in or possibly by adhesively bonding them in order to prevent loss, and there is in general no need to carry out any bevelling of the recesses to retain the inserts in position, especially if recesses which have an inclination and/or are joined by bridges as in the examples described are used.

The locking to prevent slackening of the spoke is effective and repeatable, not losing any effectiveness even if the nipple is repeatedly adjusted.

In addition to this the additional machining of the inserts which is required by previous nipples is eliminated, likewise making the nipple more robust and improving the grip of the same on the spoke.

The invention claimed is:

1. An improved nipple for spokes of spoked wheels, said nipple comprising
    a head which is wider than a shank, wherein a partly threaded through hole passes through said head and said shank, said through hole defining a longitudinal thread axis, the head having a front head surface through which the threaded through hole passes,
    at least one recess extending in the head and at least one insert of material which is deformable in comparison with the material of the nipple inserted in each at least one recess and wherein each at least one recess intersects a perimeter of a threaded surface of the head and shank defining the through hole, said recess and insert being shaped and positioned relative to the hole in such a way that the at least one insert is held in the corresponding recess in a position such that the insert partly projects into the hole over a corresponding limited circumferential length to interfere with thread of the spoke over that length and prevent undesired slackening of the nipple with respect to the spoke,
    wherein the at least one recess extends from the front head surface substantially longitudinally and parallel to the longitudinal thread axis and has a transverse cross-section which is smaller than the transverse cross-section of the hole, and
    wherein the thickness of the head extending from the thread of the threaded through hole to an external edge of the head is only partially crossed by the recess; and
    wherein the at least one recess is inclined with respect to an axial direction of the hole.

2. The nipple according to claim 1, wherein the at least one insert has one extremity machined in such a way that the portion projecting into the hole has a surface with a curvature which substantially matches that of the hole.

3. The nipple according to claim 1, wherein further lengths of the hole which do not interfere with the thread of the spoke are defined alongside the circumferential lengths.

4. The nipple according to claim 3, wherein lengths of the hole which do not interfere with the thread of the spoke have a thread such that a corresponding threaded portion of the spoke can be screwed therein.

5. The nipple according to claim 1, wherein the at least one recess is a blind hole, the axis of the blind hole not corresponding to the axis of the hole.

6. The nipple according to claim 5, wherein the at least one insert in the blind hole is of cylindrical shape.

7. The nipple according to claim 1, wherein the at least one insert is made of plastics material.

8. The nipple according to claim 1, wherein at least one insert is held in the corresponding recess by interference.

9. The nipple according to claim 1, comprising at least two inserts wherein the inserts are interconnected to form units which can be separately manipulated.

10. The nipple according to claim 9, wherein the inserts are interconnected by a bridge, the head of the nipple having a corresponding housing to receive the bridge.

11. The nipple according to claim 9, wherein the inserts are joined together in a number equal to or a submultiple of the number of recesses in each nipple.

12. The nipple according to claim 1, wherein the at least one insert comprises a thermoplastic resin.

\* \* \* \* \*